Patented Aug. 14, 1951

2,564,106

UNITED STATES PATENT OFFICE 2,564,106

FOOD ANTIOXIDANTS

Myers F. Gribbins and Harry R. Dittmar, Wilmington, Del., assignors to E. I. du Pont de Nemours & Company, Wilmington, Del., a corporation of Delaware No Drawing. Application October 29, 1948, Serial No. 57,426

6 Claims. (Cl. 252—404)

This invention relates to the stabilization of animal feeds, soaps, soap products, and cereals; to the retardation in loss of potency of vitamins; to the inhibition of rancidity in animal, vegetable or fish oils, fats or waxes; and to the stability of foods. The invention is more particularly related to the use of a substituted beta-mercaptopropionic acid with an antioxidant for the aforesaid and like purposes.

It is well known that comestibles, pharmaceuticals, cosmetics, and forage materials deteriorate on standing in contact with air by loss of flavor, potency and/or odor—frequently to such an extent that they become wholly unsuitable for ingestion or use. A number of patents have issued which provide means of extending the useful life of some of these products, and for the most part these patents describe the use of various types of antioxidants such as: the beta-substituted-mercaptopropionic acids and their esters—U. S. 2,397,960; U. S. 2,397,967; 2,416,052; nordihydroguaiaretic acid—Brazil Patent 34,370, and compounds having the formula $HN:C(NHR)R'$ in which R and R' are H, alkyl, acyl, alkylol, $NH_2$, OH, $CONH_2$, CN, esterified carboxyl, guanido or $CONHNH_2$—Danish Patent 64,773. These antioxidants vary in their effectiveness, but they all, by and large, have the disadvantage of high cost. The desirability of extending their utility by decreasing cost is apparent.

An object of the present invention is to provide a composition of matter which on addition to an antioxidant gives a total effect that is greater than the sum of the two effects taken independently. A specific object is to provide new compositions of matter comprising a beta-mercaptopropionic acid and a phenolic antioxidant. A further object is to provide, as new compositions of matter, an antioxidant and a beta-substituted-mercaptopropionic acid incorporated in animal, vegetable or fish oils, fats or waxes; vitamins, cereals, soaps and soap products, animal feeds and other comestibles, pharmaceuticals, cosmetics, and forage materials subject to deterioration due to oxidation or related degradation. Other objects and advantages of the invention will appear hereinafter.

These and other objects are accomplished in accord with the invention by the addition and use with an antioxidant of from 10 to 75% by weight of a beta-substituted-mercaptopropionic acid. It has been known that the beta-substituted-mercaptopropionic acids are antioxidants for use in food and food products, and particularly for use in the treatment of fats, oils and waxes, to inhibit the development of rancidity. It was not known, however, that by the addition of these acids to another antioxidant the resulting improved effectiveness would not be the arithmetical sum of the separate antioxidants, but an effect greater than the sum of the two effects; in other words, that by this addition a synergistic effect was attained. This synergism does not appear to be limited to specific combinations, but is broadly applicable to combinations of beta-mercaptopropionic acids with antioxidants generally, and more especially with the phenolic antioxidants such as the alkylated hydroxyanisols, hydroquinone, and gum guaiac.

Beta-beta-thiodipropionic acid (thiodipropionic acid) appears to be outstanding in its ability to improve the stabilizing properties of antioxidants generally. There are a number of related beta-substituted-mercaptopropionic acids, however, that have a similar influence and these acids may be described as having this structure:

$$HOOCCH_2CH_2S-X$$

in which the monovalent substituent "—X" of the sulfur group is: a hydrocarbon group, an oxygenated-hydrocarbon group, a sulfur-hydrocarbon group, a sulfur- and oxygenated-hydrocarbon group, or a sulfur-nitrogen-hydrocarbon group. These substituents of mercaptopropionic acid are more fully described in U. S. Patent 2,397,960, issued April 9, 1946, wherein examples of the derivatives are abundantly described among which are included respectively, 3-methyl-mercaptopropionic acid, 3-hydroxymethyl mercaptopropionic acid, 3-mercaptoethyl mercaptopropionic acid, carboxyethiaethyl mercaptopropionic acid, and 3-benzothiazyl mercaptopropionic acid.

While the above hydrocarbon, alcohol, ether, aldehyde, and acid derivatives of beta-mercaptopropionic acid are advantageously used alone with antioxidants generally to give the synergistic effect, mixtures of them may likewise be used. Why the acid or mixture thereof when mixed with an antioxidant has this surprising influence is not understood, but it has been found that in all instances in which these acids have been added to an antioxidant, antioxidational synergism is present.

The antioxidants that may be treated in accord with the process of this invention to increase their effectiveness include:

1. Vegetable oils, including palm, kapok, hydrogenated sesame, hydrogenated soybean, crude cottonseed, and crude soybean oils.

2. Solvent-extracted wheat germ oil.
3. Distillate from the steam deodorization of sesame oil.
4. Tocopherols.
5. Hydroxy-chromans, hydroxycoumarans, and other compounds related to tocopherols.
6. Naphthols, quinones, and quinoles and/or the compounds named under 5 above.
7. Caffeic acid and its esters, caffeic acid derivatives such as hydrocaffeic acid.
8. Lecithin or phosphatides from soybean oil.
9. Phosphatides from corn and cottonseed oils.
10. Phosphatides from animal tissues.
11. Reaction product of monoglycerides, phosphoric acid, and beta amino ethanol.
12. Reaction product of fat, a phosphorous compound, such as lecithin, or phosphoric acid, and a sugar.
13. Phosphoric acid esters of polyhydric phenols.
14. Organic acids, including oxalic, tartaric, maleic, malonic, malic, citric, pyruvic, succinic, fumaric, aconitic, etc.
15. Ascorbic acid.
16. Fatty acid monoesters of l-ascorbic, and d-isoascorbic acid.
17. Reaction product of castor oil with citric, tartaric, or other organic acid, or with maleic anhydride.
18. Nordihydroguaiaretic acid.
19. Gum guaiac.
20. Southern sweet gum.
21. Licorice resin.
22. Residue from distillation of clove oil or other spice oil.
23. Gallic acid, propyl gallate, and other gallates.
24. Condensation product of a polyphenol (as pyrogallol) with ketones, aldehydes, fatty acids, etc.
25. Phenol derivatives, such as methyl vanillate, methyl syringate, etc.
26. Phenolic compounds, as for example vanillyl alcohol and coniferyl alcohol.
27. Phenolic compounds, as for example catechol monododecyl ether.
28. High molecular weight ortho- and para-polyhydroxy benzene compounds, such as dodecyl catechol and dodecyl hydroquinone.
29. Oat flour and other cereal flours and ground seeds, and vegetable materials.
30. Ethyl ester or other organic ester of tyrosine.
31. Sugar amines or amine salts such as glucamine, methyl glucamine, lauryl glucamine, etc.
32. Hydroxamic acids.
33. Thio- di-fatty acids and their esters.
34. Substituted-beta-mercaptopropionic acid.
35. Tocopherols.
36. Tannins.
37. Norconidendrin.
38. Flavones and flavone derivatives.
39. Alkylated hydroxyanisoles.

The mixtures of a beta-substituted-mercaptopropionic acid with an antioxidant may be added separately to the product to be preserved or dissolved first in a mutual solvent of the mixture and the resulting solution added to the product. Examples of suitable mutual solvents are propylene glycol, glycerine, liquid fats, purified mineral oil, etc.

The surprising and unexpected rancidity inhibiting effect, stabilizing influence, potency retention and freshness extension of the substituted-beta-mercaptopropionic acids, when added to antioxidants, are demonstrated by the following test: The test was conducted by a method generally known as the Swift test. This method is described in "Oil and Soap" 10, 105–109 (1933), in an article by A. E. King et al., "An Accelerated Stability Test Using The Peroxide Value As An Index." Briefly stated, this test involves placing the oil to be tested in a constant temperature bath and subsequently bubbling air through the products. There follow results obtained on a treatment of lard with representative mixtures of antioxidant and a thiodipropionic acid in the Swift test. The peroxide value, as described in the above article, is a measure in degree of rancidity, each product or fat having a fairly definite peroxide value at which it is definitely rancid.

Table I

| | AOM (hrs.)[1] |
|---|---|
| Prime steam lard | 4¼ |
| +0.01% TDPA[2] | 23 |
| +0.003% HQ[3] | 34¾ |
| +0.01% BHA[4] | 46¾ |
| +0.003% HQ+0.01% BHA | 85 |
| +0.01% TDPA+0.003% HQ | 100¾ |
| +0.01% TDPA+0.01% BHA | 112 |
| +0.01% TDPA+0.003% HQ+0.01% BHA | 133 |

[1] AOM (hrs.) equals hours required for rancidification under test conditions.
[2] Thiodipropionic acid.
[3] Hydroquinone.
[4] Butylated hydroxyanisole.

Table II

| | AOM (hrs.)[1] |
|---|---|
| Lard | 2¼ |
| 0.05 TDPA | 20¼ |
| 0.10 lecithin | 7 |
| 0.10 glycerol | 3½ |
| 0.10 tartaric acid | 4¼ |
| 0.10 citric acid | 2½ |
| 0.05 TDPA+0.10 lecithin | 72 |
| 0.05 TDPA+0.10 glycerol | 72 |
| 0.05 TDPA+0.10 ethyl tyrosine | 64 |
| 0.05 TDPA+0.10 citric acid | 64 |
| 0.05 TDPA+0.10 tartaric acid | 88+ |

[1] AOM (hrs.) equals hours required for rancidification under test conditions.

The synergized antioxidant mixtures of the invention are exceptionally useful in the treatment of various oils, fats, waxes and other products subject to deterioration on standing or storing. The composite antioxidants are particularly effective for the treatment of vegetables, animal, and fish oils, fat-containing foods such, for example, as lard, butter, oleomargarine, olive oil, corn oil, cod liver oil, ice cream, mayonnaise, salad dressing, meats, as well as products containing these materials such as pastry, cakes, crackers, cookies, bread, potato chips, doughnuts, popcorn and the like. The products are likewise suitable for the treatment of soaps and soap products, for the addition to carotenes, vitamin A and vitamins generally to maintain their initial potency, for addition of cereals to maintain their palatability and for addition to animal feeds, cosmetics, pharmaceuticals, human comestibles which deteriorate due to oxidation and allied causes.

We claim:
1. Thiodipropionic acid and butylated hydroxyanisole in solution in a mutual solvent therefor, the combination producing a synergistic action of the antioxidants.
2. Thiodipropionic acid and butylated hydroxy anisole in solution in propylene glycol, the combination producing a synergistic action of the antioxidants.

3. An antioxidant composition containing from 10 to 75% thiodipropionic acid and a substantial part of the remainder, butylated hydroxyanisole.

4. An antioxidant composition comprising an alkylated hydroxyanisole and from 10 to 75% by weight of a beta-substituted mercaptopropionic acid having the linear structural formula $HOOCCH_2CH_2S-X$ in which the monovalent substituent "—X" is of the group consisting of hydrocarbons, oxygenated-, sulfur-, sulfur- and oxygenated, and sulfur- and nitrogen hydrocarbons.

5. An antioxidant composition comprising an alkylated hydroxyanisole and from 10 to 75% by weight of thiodipropionic acid.

6. An antioxidant composition comprising an antioxidant of the group consisting of alkylated hydroxyanisole, tartaric acid, citric acid, glycerol, lecithin, and ethyl tyrosine and from 10 to 75% by weight of a beta-substituted mercaptopropionic acid having the linear structural formula $HOOCCH_2CH_2S-X$ in which the monovalent substituent "—X" is of the group consisting of hydrocarbons, oxygenated-hydrocarbon, sulfur-hydrocarbon, sulfur- and oxygenated hydrocarbon, and sulfur-nitrogen hydrocarbon groups.

MYERS F. GRIBBINS.
HARRY R. DITTMAR.

REFERENCES CITED

The following references are of record in the file of this patent:

UNITED STATES PATENTS

| Number | Name | Date |
| --- | --- | --- |
| 1,903,126 | Newton et al. | Mar. 28, 1933 |
| 1,983,654 | Black | Dec. 11, 1934 |
| 2,333,656 | Mattill et al. | Nov. 9, 1943 |
| 2,333,657 | Mattill et al. | Nov. 9, 1943 |
| 2,397,960 | Gribbins et al. | Apr. 9, 1946 |
| 2,416,052 | Gribbins et al. | Feb. 18, 1947 |

OTHER REFERENCES

Kraybill et al., "Studies on Antioxidants," Bulletin No. 2, issued by the American Meat Institute Foundation, Apr. 1948, 9 pages. (Copy in 252–407.)